United States Patent [19]

Scheuerman et al.

[11] 4,122,896
[45] Oct. 31, 1978

[54] ACIDIZING CARBONATE RESERVOIRS WITH CHLOROCARBOXYLIC ACID SALT SOLUTIONS

[75] Inventors: Ronald F. Scheuerman; Edwin A. Richardson; Charles C. Templeton, all of Houston, Tex.

[73] Assignee: Shell Oil Company, Houston, Tex.

[21] Appl. No.: 842,204

[22] Filed: Oct. 14, 1977

[51] Int. Cl.² .............................................. E21B 43/27
[52] U.S. Cl. ...................... 166/250; 166/307; 166/308
[58] Field of Search ............... 166/250, 271, 281, 307, 166/308; 252/8.55 C

[56] References Cited

U.S. PATENT DOCUMENTS

| 2,175,079 | 10/1939 | Dow | 252/8.55 C |
|---|---|---|---|
| 2,640,810 | 6/1953 | Cardwell et al. | 252/8.55 C |
| 2,652,360 | 9/1953 | Bond et al. | 166/307 |
| 2,867,279 | 1/1959 | Cocks | 166/307 X |
| 2,910,436 | 10/1959 | Fatt et al. | 166/307 |
| 3,251,415 | 5/1966 | Bombardieri et al. | 166/307 |
| 3,508,613 | 4/1970 | Huff et al. | 166/307 |
| 3,618,665 | 11/1971 | Fudlford | 166/307 |
| 3,630,285 | 12/1971 | Clayton, Jr. et al. | 166/307 X |
| 3,828,854 | 8/1974 | Templeton et al. | 166/307 |
| 3,892,275 | 7/1975 | Lybarger et al. | 166/307 X |

*Primary Examiner*—Stephen J. Novosad
*Assistant Examiner*—George A. Suchfield

[57] ABSTRACT

A carbonate reservoir is acidized slowly by injecting an aqueous solution of a chlorocarboxylic acid salt so that the rate of the acidization is limited to the rate at which an acid is formed by the hydrolyzing of the chlorocarboxylate ions.

14 Claims, 4 Drawing Figures

AQUEOUS SOLUTIONS IN WHICH:

A - $ClCH_2COO^-$ CONTACTS $CaCO_3$ OR $CaMg(CO_3)_2$
B - $ClCH_2COO^-$ + $F^-$ CONTACTS CLAY
C - $HCOOCH_3$ + $F^-$ CONTACTS CLAY
D - $HCOOCH_3$ CONTACTS $CaCO_3$

AQUEOUS SOLUTIONS IN WHICH:

A - $ClCH_2COO^-$ CONTACTS $CaCO_3$ OR $CaMg(CO_3)_2$
B - $HCOOCH_3$ CONTACTS $CaCO_3$ OR $CaMg(CO_3)_2$
C - $CH_3COOH + CH_3COO^-$ CONTACTS $CaMg(CO_3)_2$
D - $HCOOH + HCOO^-$ CONTACTS $CaMg(CO_3)_2$
E - $CH_3COOH + CH_3COO^-$ CONTACTS $CaCO_3$

ACIDIZING CARBONATE RESERVOIRS WITH CHLOROCARBOXYLIC ACID SALT SOLUTIONS

BACKGROUND OF THE INVENTION

The invention relates to acidizing an acid-reactive material, such as a carbonate mineral or deposit in or around the borehole of a well, to dissolve or at least chemically alter the acid-reactive material. The invention is particularly useful in matrix and/or fracture acidizations of subterranean carbonate reservoirs, particularly those in which the temperatures are relatively high, e.g., at least about 120° F.

The need for achieving slow acidizations in carbonate reservoirs has been known for more than about 40 years. U.S. Pat. No. 2,059,459 (filed June 5, 1936) mentions that hydrochloric acid tends to be spent before it penetrates any significant distance into the reservoir and its rapid and violent reaction tends to develop insoluble fine solids that impair permeability. The patent suggests injecting both a nonaqueous fluid capable of forming or releasing an acid and a water or brine that ensures that release. U.S. Pat. No. 2,301,875 suggests using an aqueous buffer solution of a weak acid and a weak acid salt which has a relatively high pH and a relatively low rate of reaction due to the low hydrogen ion concentration. U.S. Pat. No. 2,863,832 suggests improving the process of the U.S. Pat. No. 2,059,459 patent by injecting only an oil solution of an organic acid anhydride that forms the acidizing solution in situ without injecting any water. A series of patents by R. E. Dilgren and Dilgren and F. M. Newman, U.S. Pat. Nos. 3,215,199; 3,297,090; and 3,307,630, suggest injecting a hydrolyzable organic halide, such as a halogenated hydrocarbon or ether, mixed with a solvating medium, such as water, to form hydrochloric acid by an in situ solvolysis reaction. U.S. Pat. No. 3,441,085 suggests slowly acidizing a carbonate reservoir by (a) injecting a weak acid or a weak acid solution which is so concentrated that the rate of acidization is impeded by the amount of salts which are precipitated from the concentrated solution, and (b) subsequently injecting water or brine to dissolve the precipitated salts and cause further acid acidization and acid penetration. U.S. Pat. No. 3,630,285 describes a process for slowly acidizing a hot carbonaceous reservoir by injecting water and a water-soluble ester of an organic carboxylic acid (where the reservoir temperature is at least 200° F.) so that a carboxylic acid is formed by the hydrolysis of the ester.

A copending patent application, Ser. No. 813,014, filed July 5, 1977 by E. A. Richardson and C. C. Templeton describes a process for slowly acidizing a reservoir that contains siliceous and/or argillaceous materials. An aqueous solution containing salts of both hydrofluoric and chlorocarboxylic acids is injected so that a mud acid is formed within the reservoir. The chlorocarboxylate ions are hydrolyzed to yield an acid that reacts with the fluoride ions so that a clay-dissolving mud acid is formed. Numerous aspects of the procedures described in application, Ser. No. 813,014, are pertinent to the present invention and those disclosures are incorporated herein by cross-reference.

SUMMARY OF THE INVENTION

In the present invention, carbonate materials within a subterranean reservoir are acidized at a selected relatively slow rate by injecting into the reservoir a substantially acid-free aqueous solution of a chlorocarboxylic acid salt, so that the rate at which the acidization proceeds is limited to substantially the rate at which an acid is formed by the hydrolysis of the chlorocarboxylate ions.

DESCRIPTION OF THE INVENTION

Figure 1:
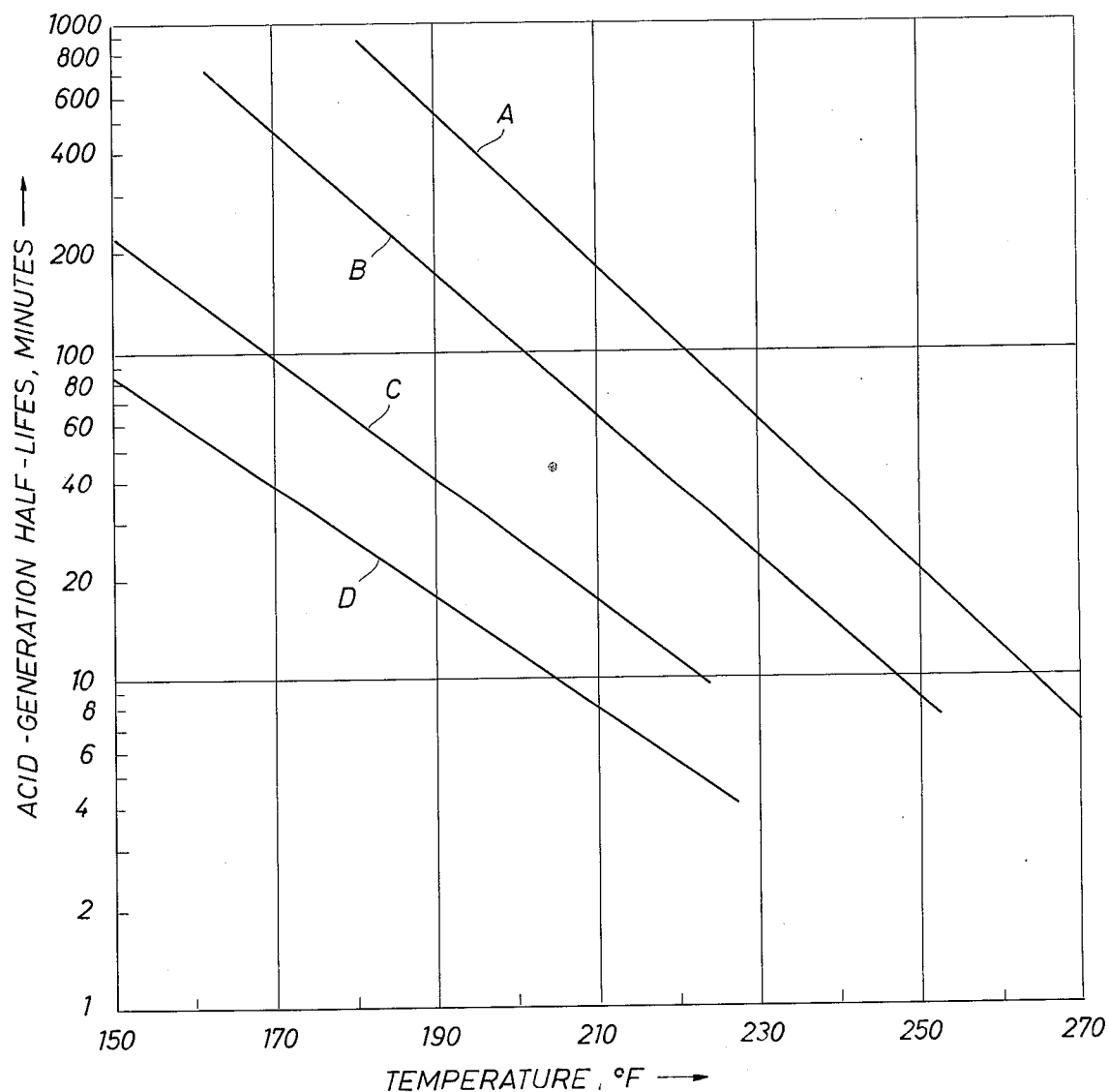
FIG. 1 shows comparative variations with temperature of the half-life times at which acids are formed within various solutions.

The present invention involves a discovery that the rate at which an aqueous solution of chlorocarboxylic acid salt hydrolyzes to form an acid, while the solution is flowing or standing within a subterranean reservoir, provides a desirably slow rate of acid-release. In addition, the properties of such a salt solution and its hydrolysis products avoid numerous disadvantages that are inherent in previously proposed compositions or procedures for slowly acidizing carbonate mineral materials. Strong acids are known to react with carbonates so fast that they tend to be completely spent on the first contacted portions. In a carbonaceous reservoir the strong acids tend to form pore-plugging insoluble fine solids and also to reduce the mechanical stability of the reservoir. Weak organic acids react slower, but still too fast to allow a significant depth of penetration, and they tend to reach a thermodynamic equilibrium that generally limits the extent of their reaction to a degree that reduces the desirability of their use.

The carbonate mineral-acidization behaviors of weak acids, as typified by formic, acetic, proprionic and chloroacetic acids, are described in SPE Paper No. 5647, presented at Dallas, Texas, Sept. 28, to Oct. 1, 1975. The paper indicates that the relatively limited degree of reactions is a crucial issue in selecting an appropriate weak acid for use in a particular situation. It also mentions that, under the test conditions, the reaction of chloroacetic acid was more like that of a strong acid in respect to proceding almost to completion.

A more complete acid-base reaction by chloroacetic acid is due to its being a much stronger acid than the other acids that were tested. The $pk_a$ of chloroacetic acid is 2.86 whereas that of formic acid is 3.75, and that of acetic acid is 4.75. The $pk_a$ of a solution of a weak acid is the pH exhibited when the concentration of the undissociated acid equals the concentration of the acid anion.

In the present process a substantially acid-free solution of a chlorocarboxylic acid salt contacts an acid-reactive carbonate material at the relatively high temperature of a subterranean reservoir. Where the carbonate material is $CaCO_3$ and the chlorocarboxylic acid salt is a salt of chloroacetic acid, the hydrolysis and acidization reactions appear to be:

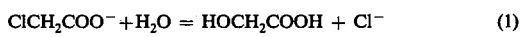

$$ClCH_2COO^- + H_2O = HOCH_2COOH + Cl^- \qquad (1)$$

$$HOCH_2COOH = HOCH_2COO^- + H^+ \quad (2)$$
$$CaCO_3 + 2H^+ = CO_2 + Ca^{++} + H_2O \quad (3)$$

The likelihood of those reactions being the main, if not the only, reactions that occur has been indicated by tests, such as x-ray analyses of compounds precipitated from solutions of ammonium chloracetate that were hydrolyzed in contact with calcium carbonate so that the carbonate was dissolved. The x-ray patterns of the solids which precipitated (when the solutions were cooled) corresponded to those of a hydrated calcium glycolate.

Whether or not the above reaction mechanism is correct, in the conditions encountered within typical carbonate reservoirs, the present process appears to involve a hydrolysis-limited rate of reaction which is many times slower than the rate of an acidization by a weak acid (such as the acidizations described in SPE Paper No. 5647) or an acidization by a relatively high-pH buffered acid solution (such as the acidizations described in U.S. Pat. No. 2,301,875).

In addition, relative to prior processes, the process of the present invention avoids the need for depending on the diffusion of an acid out of an oil solvent, or depending on the partitioning of an acid between oil and water phases (as is required in using emulsions of aqueous acids with oils, or organic solvent-solutions of acids or acid-forming materials (of the type described in U.S. Pat. Nos. 2,059,459 and 2,863,832) or the like. The present invention also avoids the refining problems that may be caused by using a chlorinated hydrocarbon or ester or acid that might become dissolved within the oil produced from the treated reservoir (such as the organic halides of the Dilgren and Newman patents or the chloroacetic acid of the SPE Paper No. 5647). The present invention also avoids forming a precipitated solid material that would impede the permeability of a reservoir if the precipitates were not completely dissolved by a subsequently injected solvent (such as the precipitate-forming acidization rate-delaying process described in U.S. Pat. No. 3,441,085). And, since chlorocarboxylic acids and their salts comprise nonvolatile liquids or solids, the present invention avoids the problems of using acidizing fluids comprising or containing volatile and flammable liquids such as esters and alcohols, which may need to be mixed with the reservoir water in order to react (such as those described in U.S. Pat. No. 3,630,285).

However, we have also discovered that, in situations where the volatility and flammability of a relatively water-soluble ester are not unduly disadvantageous, an aqueous solution of an ester can form an acid without being mixed with the reservoir water and can be advantageously used in conjunction with an aqueous solution of a chlorocarboxylic acid salt in accordance with the present invention. Unobviously, in the light of the rates of reaction which are discussed in U.S. Pat. No. 3,630,285 (which may reflect those exhibited by substantially immiscible mixtures of water and an ester or an oil solvent solution of an ester) the reaction rates of, e.g., an aqueous solution of 1–2 moles per liter of methyl formate, in the presence of carbonate minerals, are near to but faster than those of, e.g., a salt of chloroacetic acid. Such ester solutions can advantageously be mixed with, or alternated with, a chlorocarboxylic acid salt solution in order to increase the rate and/or extent of acidization in the near-borehole region of a subterranean reservoir.

Aqueous liquids suitable for use in the present process can comprise substantially any that are not so loaded with dissolved salts as to inhibit the dissolving of more. Where the reservoir being treated is free of water sensitive clays, the water used to dissolve the chlorocarboxylate salt is preferably substantially free of electrolytes. In general, aqueous liquids containing from about 2–4% by weight total dissolved salts are preferred, particularly where the salts are ammonium or potassium salts, where the reservoir may have at least some sensitivity to fresh water.

In general, chlorocarboxylic acid salts suitable for use in the present process can comprise substantially any such salts which are readily water-soluble and are hydrolyzable (with respect to at least one, and preferably all, of the chlorine atoms they contain) at moderate temperatures such as about 100°–300° F. at moderately slow rates. The rates of hydrolysis are preferably adapted to provide half-lives for the unhydrolized chlorocarboxylic acid salts of from about 0.5 to 10 hours. Such chlorocarboxylic acid salts can be the salts of acids containing one or a plurality of chlorine atoms attached to aliphatic, alicyclic, aromatic or the like carboxylic acids. Examples of suitable acids from which the salts can be formed include monochloroacetic acid, dichloroacetic acid, 2-chloroproprionic acid, ortho, meta or para-chlorobenzoic acid, 2,3-dichlorobenzoic acid, or the like. Particularly suitable chlorocarboxylic acid salts comprise those having hydrolysis reaction half-lives of suitable duration at the temperatures which are commonly encountered subterranean carbonate reservoirs, such as the salts of mono-chloroacetic acid, 2-chloropropionic acid, and dichloroacetic acid. The ammonium salts are preferred.

The present invention is particularly useful for slowly acidizing carbonate mineral reservoirs consisting mainly of limestone and/or dolomites (which tend to be violently reactive with strong acids). The invention is also useful for treating siliceous or other reservoirs in which the permeability may be impaired by the presence of substantially any acid-soluble material capable of reacting with a weak organic acid, such as a naturally fractured sandstone reservoir containing carbonate solids within the fractures, etc.

The present invention is also useful for well treatments in which relatively viscous fluids are displaced into particular locations in order to accomplish particular results. For example, a thickened aqueous solution of a chlorocarboxylic acid salt can be used to position a slurry of fracture-propping particles within a fracture, to provide a viscous, low fluid-loss solution that is or will become a slow acting acid that can be displaced along or into the walls of a fracture, to position such a viscous slow-acting acid within a permeable portion of a heterogeneously permeable reservoir in order to divert a faster-acting acid into a less permeable portion, or the like. Where a relatively high viscosity is desirable, the chlorocarboxylic acid salt solutions preferably contain a water-thickening material, such as a water-soluble cellulose ether and/or a guar gum, or guar gum derivative or a Xanthan gum, or other polysaccharide or hydrolyzed polyacrlyamide, etc. The water-thickening material is preferably one that is relatively easily converted to relatively non-viscous liquid by the action of a copresent viscosity breaker, such as a redox type, enzymatic, or other type of viscosity-breaking reactant. Examples of such thickeners include hydroxyethylcellulose, carboxymethylcellulose, methylcellulose, Xanthan gum polymers, guar gum polymers, and the like.

Examples of such thickeners which are advantageously completely water-soluble materials which form substantially completely water-soluble hydrolysis products when they are hydrolyzed in an aqueous acidic and/or persulfate, periodate or the like breaker-containing solutions include hydroxyethylcelluloses, such as Natrosol 250 available from Hercules Powder Company, J-164 available from Dow Chemical Company, or WG-8 available from Halliburton Services Company.

Numerous laboratory tests have been made of the reactions involved in the present process. Initially, Indiana limestone cores were used, but it was found that, as a result of "wormholing" (in which the injected acid forms one or a few channels extending all the way through the core, then tends to widen that channel without affecting the rest of the core) the cores tended to provide fluid residence times that varied in an unpredictable manner. In view of this, substantially all of the tests discussed herein were performed in cylindrical sandpacks having dimentions of about 1×13 inches, consisting of Clemtex No. 5 sand (a well-washed quartz sand, having a median grain size of about 150 microns, available from Clemtex Ltd.) containing about 5% by weight of about 1 darcy.

Table I contains data derived from tests of aqueous solutions of ammonium chloracetate. The tested solutions were flowed through such packs against a back pressure of about 1,000 psi at the indicated temperatures and flow rates. Aliquot portions of the effluents were sampled, at selected times, and were utilized for measurements of the indicated properties such as pH, chloride ion content, calcium ion content (with total magnesium and calcium ion contents being reported as equivalent calcium content), ratio of chloride ion content to calcium ion content, and the like.

rial, by means of measuring the chloride ion contents of the solutions at selected times). Particularly with respect to salts of monochloroacetic acid, correlations between those rates and the rates of carbonate dissolution were determined by measuring the half-life times and effective spending-times (three half-lives) of such salts in sand packs containing calcium carbonate or dolomite. Comparisons of these measurements with analogous measurements in the presence of sand and clay packs (of the type described in application Ser. No. 813,014) indicate that the chlorocarboxylic acid salts hydrolyze about 60% slower in a calcium environment than in a sand or clay environment. This difference appears to be the result of the differing equilibrium pH's in such environments. A decrease in pH slows the rate of hydrolysis. In a clay-containing environment the dissolving provided by an ammonium chloroacetate solution proceeds at a pH of about 6 to 7, whereas in a carbonate containing pack, even at atmospheric pressure, the pack effluent pH's are about 4.7 to 5.5 and the pH within the pack is lower because the $CO_2$ is kept in solution by the 1,000 psi back pressure. In general, the half-lives of chlorocarboxylic acid salts double for about every 13° F. decrease in temperature.

In conducting the present process, no particular mixing sequence or procedure is required for forming the solution of chlorocarboxylic acid salts. Where the chlorocarboxylic salts are formed by neutralizing an acid such as chloroacetic acid, the neutralization evolves heat and the solution will warm as the mixing proceeds.

Table II provides recipes for neutralizing chloroacetic acid with either ammonia (anhydrous or 26° Baume) or sodium hydroxide (flake or 50% liquid). When using ammonia it is generally desirable that the chloroacetic acid addition begin prior to the addition of the ammonia

Table I

| Test | Pack[a] Type | Chloroacetate Concentration (moles/liter) | Temp. °F | Flow Rate cc/min | $t_r$[b] min | k (X1000) min$^{-1}$ | $t_{\frac{1}{2}}$[c] min | Equilibrium Effluent Analysis Concentration, moles/liter | | | |
|---|---|---|---|---|---|---|---|---|---|---|---|
| | | | | | | | | pH[d] | Cl$^-$ | Ca$^{++}$ | Cl$^-$/Ca$^{++}$ |
| 1 | CaCO$_3$ | 1.0 | 190 | 1.0 | 128 | 1.31 | 529 | 5.5 | 0.155 | 0.085 | 1.82 |
| 2 | CaCO$_3$ | 1.0 | 190 | 2.0 | 64 | 1.86 | 372 | 5.5 | 0.113 | 0.060 | 1.88 |
| 3 | CaCO$_3$ | 2.0 | 190 | 2.0 | 64 | 2.88 | 240 | 5.5 | 0.339 | 0.150 | 2.26 |
| 4 | CaCO$_3$ | 2.0 | 190 | 2.0 | 64 | 2.83 | 245 | 5.5 | 0.333 | 0.150 | 2.22 |
| 5 | CaCO$_3$ | 2.0 | 190 | 1.0 | 128 | 2.58 | 269 | 5.3 | 0.564 | 0.230 | 2.45 |
| 6 | CaCO$_3$ | 1.0 | 210 | 1.0 | 128 | 3.91 | 177 | 5.3 | 0.395 | 0.185 | 2.14 |
| 7 | CaCO$_3$ | 1.0 | 210 | 2.0 | 64 | 3.98 | 174 | 5.5 | 0.226 | 0.120 | 1.88 |
| 8 | CaCO$_3$ | 1.0 | 210 | 2.0 | 64 | 7.43 | 93 | 5.5 | 0.380 | 0.200 | 1.90 |
| 9 | Dolomite | 1.0 | 210 | 2.0 | 64 | 3.98 | 174 | 5.3–5.5 | 0.226 | 0.100[e] | 2.26 |
| 10 | CaCO$_3$ | 2.0 | 210 | 2.0 | 64 | 10.58 | 66 | 4.7 | 0.987 | 0.490 | 2.01 |
| 11 | CaCO$_3$ | 2.0 | 210 | 2.0 | 64 | 6.26 | 111 | 5.0 | 0.663 | 0.280 | 2.37 |
| 12 | CaCO$_3$ | 1.0 | 230 | 1.0 | 64 | 10.30 | 67 | 4.7 | 0.733 | — | — |
| 13 | CaCO$_3$ | 1.0 | 230 | 2.0 | 64 | 9.33 | 74 | 5.0 | 0.451 | 0.205 | 2.20 |
| 14 | CaCO$_3$ | 1.0 | 230 | 2.0 | 64 | 10.59 | 65 | 5.3 | 0.494 | 0.225 | 2.20 |
| 15 | CaCO$_3$ | 2.0 | 230 | 4.0 | 32 | 16.33 | 42 | 4.7 | 0.818 | 0.375 | 2.18 |
| 16 | CaCO$_3$ | 0.5 | 250 | 2.0 | 64 | 32.26 | 22 | 5.3 | 0.437 | 0.185 | 2.36 |
| 17 | CaCO$_3$ | 1.0 | 250 | 2.0 | 64 | 29.11 | 24 | 4.7 | 0.846 | 0.380 | 2.22 |
| 18 | 10% CaCO$_3$ | 1.0 | 250 | 2.0 | 64 | 45.38 | 17 | 4.3 | 0.930 | 0.390 | 2.38 |
| 19 | Dolomite | 1.0 | 250 | 2.0 | 64 | 36.22 | 19 | 4.7 | 0.903 | 0.395[e] | 2.29 |

[a]Five percent by weight finely ground CaCO$_3$ or dolomite (49.9 mole % Ca, 51.1 mole % Mg), 1000 psi back pressure.
[b]Solution residence time in pack, $t_r$ = pore volume ÷ pump rate.
[c]Chloroacetate half-life.
[d]pH of pack effluent at atmospheric pressure, hence, significant loss of equilibrium $CO_2$.
[e]Total Mg$^{++}$ plus Ca$^{++}$ reported as equivalent Ca$^{++}$.
k = First order reaction rate constant.

Comparative tests were made of the hydrolysis rates at various temperatures for various chlorocarboxylic acids in buffered aqueous solutions of various pH's (in test tubes in the absence of any sand or carbonate mateand that the acid be maintained in excess throughout the mixing operation so that the pH is kept below 8 and the vaporization of ammonia is inhibited.

Table II

| Desired Chloroacetate Conc., moles/liter | Chloroacetic acid, lbs. | MIXING RECIPES FOR 10 BBLS CAS-CA | | | Water bbls | Chemical[b] Cost $/bbl | Pounds CaCO$_3$ Dissolved per bbl | $/lb CaCO$_3$ Dissolved |
|---|---|---|---|---|---|---|---|---|
| | | Neutralizing Chemical Used (use only one) | Amount | | | | | |
| 0.5 | 165.4 | anhydrous ammonia | 5.8 | gal | 9.6 | 6.55 | 8 | 0.82 |
| | | 26° Be Aqua Ammonia | 14.1 | gal | 9.4 | 7.08 | | 0.89 |
| | | 50% NaOH[a] liquid | 11.1 | gal | 9.4 | 7.50 | | 0.94 |
| | | flake NaOH | 70 | lbs | 9.6 | 8.00 | | 1.00 |
| 1.0 | 330.8 | anhydrous ammonia | 11.7 | gal | 9.1 | 12.09 | 16 | 0.76 |
| | | 26° Be Aqua Ammonia | 28.3 | gal | 8.7 | 13.14 | | 0.82 |
| | | 50% NaOH liquid | 22.1 | gal | 8.9 | 14.01 | | 0.88 |
| | | flake NaOH | 140 | lbs | 9.2 | 15.01 | | |
| 1.5 | 496.1 | anhydrous ammonia | 17.5 | gal | 8.7 | | 24 | |
| | | 26° Be Aqua Ammonia | 42.4 | gal | 8.1 | | | |
| | | 50% NaOH liquid | 32.2 | gal | 8.3 | | | |
| | | flake NaOH | 210 | lbs | 8.6 | | | |
| 2.0 | 661.5 | anhydrous ammonia | 23.4 | gal | 8.2 | | 32 | |
| | | 26° Be Aqua Ammonia | 56.5 | gal | 7.5 | | | |
| | | 50% NaOH liquid | 44.2 | gal | 7.8 | | | |
| | | flake NaOH | 280 | lbs | 8.4 | | | |

[a] NaOH = sodium hydroxide.
[b] F.O.B. prices May 1977, does not include service company mark up. Also assumes bulk chloroacetic acid price of $0.32/lb and $1/bbl water cost.

FIG. 1 shows the variations with temperature of the half-lives of the following solutions relative to the formation of acids and dissolving of acid-reactive solid materials. Each of the solutions contained the indicated amount (in moles per liter) of the indicated solute in an otherwise substantially salt-free water. Curve A relates to 1.0 mole ammonium chloroacetate flowing through sandpacks containing (in % by weight) either 5% or 10% of calcium carbonate or 5% fo dolomite. Curve B relates to a mixture of 1.5 moles ammonium chloroacetate and 1.0 mole ammonium fluoride flowing through a sandpack containing 5% bentonite clay. Curve C relates to a mixture of 2.0 moles methylformate and 1.0 mole ammonium fluoride in which finely divided bentonite clay was suspended. Curve D relates to 1.0 mole methylformate flowing through sandpacks containing either 5% or 10% of calcium carbonate.

The separation between the curves A and D indicates that, in a treatment situation in which a particular time of reaction is desirable, an aqueous solution of an ester, i.e., methylformate, can generally be used at a temperature significantly lower than one which would be suitable for an aqueous solution of a chlorocarboxylate ion, i.e., a chloroacetate ion. The proximity of the curves A and B indicate that, in general, the hydrolysis rate of chlorocarboxylate ions, i.e., chloroacetate ions, is generally the same in the presence of limestone, dolomite, fluoride ions or clay. Similarly, the proximity of the curves C and D indicate that the hydrolysis rate of aqueous solutions of esters, i.e., methylformate, are generally similar in the presence of fluoride ions and clay or calcium carbonate. It is believed that the slower rates of hydrolysis shown by curve A relative to those of curve B, and by curve C relative to those of curve D, are due to differences in the effective pH values, which were lower in the tests providing the data for the curves A and C. In such hydrolysis rates a pH difference of less than one unit can cause a change of several fold in the rate of hydrolysis. And, in the tests in the presence of limestone or dolomite, the effective pH values in the reactive system were somewhat lower than those in the otherwise comparable reactions containing clay.

Because of the relative independence of the rates of hydrolysis to materials, such as fluoride ions or clays, the hydrolysis rates by which acids are generated from chlorocarboxylate ions in the presence of carbonate solids in accordance with the present invention, are comparable to those shown in the tests described in the copending application, Ser. No. 813,014. And, for example, the hydrolysis rates shown in FIG. 2 of that application can be utilized in determining which chlorocarboxylic acid salt should be used at a particular temperature.

Figure 2:
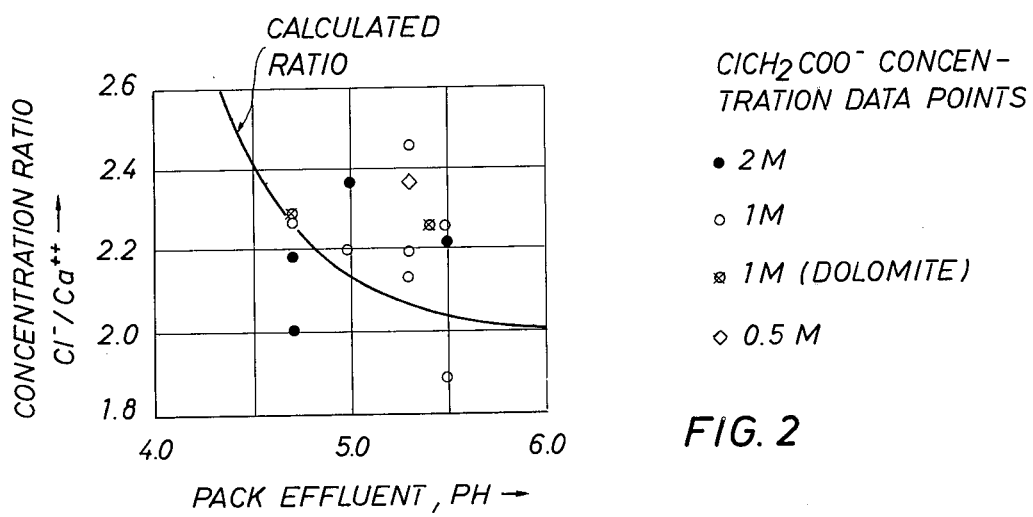
FIG. 2 shows the variations with pH of the ratio of chloride ion to calcium ion concentrations of an aqueous solution containing chlorocarboxylate ions and undissolved mineral carbonate.

FIG. 2 shows the carbonate mineral-dissolving efficiency of an aqueous solution of ammonium chloroacetate (based on the hydrolyzing of the chloroacetate ions to yield chloride ions and glycolic acid, as described above). The data points were selected and/or calculated from the data listed in Table I. As indicated in the figure, as the hydrolysis proceeds, the increasing concentration of chloride ions and glycolic acid causes the pH to decrease. As the pH decreases, the proportion of glycolic acid that remains undissociated is increased and, since the undissociated acid does not react, the carbonate-dissolving efficiency is decreased.

But, as shown by the data points on the figure, the ratio of chloride ions to calcium ions average about 2.2. This is advantageous, since it corresponds to a mineral-dissolving efficiency of about 90%, with only about 10% of the glycolic acid remaining undissociated and unreactive. If the efficiency were 100% the rates of the concentrations of the chloride and calcium ions would be 2, since two moles of acid are required to dissolve one mole of the carbonate. In the tests the concentration ratios averaged about 90% of the maximum value. The curve on the figure shows the variation (with pack effluent pH) of the calculated ratio of the concentration of chloride and calcium ions based on the difference between pH of the solution and the $pk_a$ (3.83) of glycolic acid.

Figure 3:
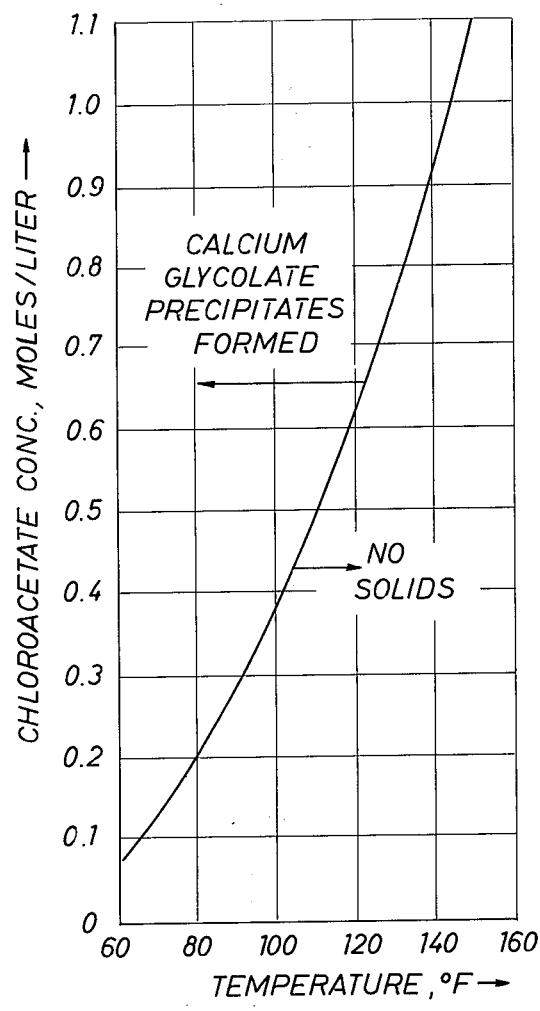
FIG. 3 shows the variation with temperature of chloroacetate concentrations conducive to calcium glycolate precipitation.

FIG. 3 shows the variations with temperature in the concentrations of chloroacetate ion that may cause precipitation of calcium glycolate from the amount of calcium carbonate dissolved by the hydrolyzing solution if the carbonate dissolving efficiency is 90%. The curve is based on the variations with temperature of the solubility of calcium glycolate and indicates, for example, that no precipitation would occur from a spent 0.5M ammonium chloroacetate acidizing solution at temperatures above 110° F.

In using the present invention in situations in which a treating liquid comprising an aqueous chlorocarboxylic acid salt solution is injected and then backflowed, the concentration of the salt solution and the treating liquid backflowing equipment and procedures are preferably correlated with both the reservoir and flowline temperatures. The solution concentration should be kept below that which may precipitate multivalent ion salts of the hydroxycarboxylic acid formed by hydrolyzing the chlorocarboxylate ions used, at the reservoir temperature. The flow lines between the reservoir interval and the pits or other large volume containers for the back-flowed liquid should be arranged, for example by keeping them short enough and/or externally heating them and/or arranging them for diluting the returning liquid with water, or the like, to the extent necessary to avoid cooling the backflowing liquid to a temperature-concentration condition conducive to significant calcium hydroxycarboxylate salt precipitation.

Table III contains data derived from tests of aqueous solutions of methyl formate. Those solutions were tested in the manner described in Table I and the data is identified as in Table I.

voir at, respectively, a temperature of 190° or 250° F. In certain situations, it may be useful to use combinations of aqueous solutions of chlorocarboxylic acid salts and lower alcohol esters which are injected either simultaneously, or one ahead of the other to provide selected rates of acidization and/or selected depths of penetrations of the acidizing treatments in a reservoir having a given temperature. In such treatments the volume of the ester solution is preferably about that of the pore volume within a cylindrical portion of the earth formation to be treated in which portion the diameter is from about 0.5 to 2 feet greater than that of the wellbore and the heighth about equals the effective vertical extent of that portion of the earth formation.

Figure 4:
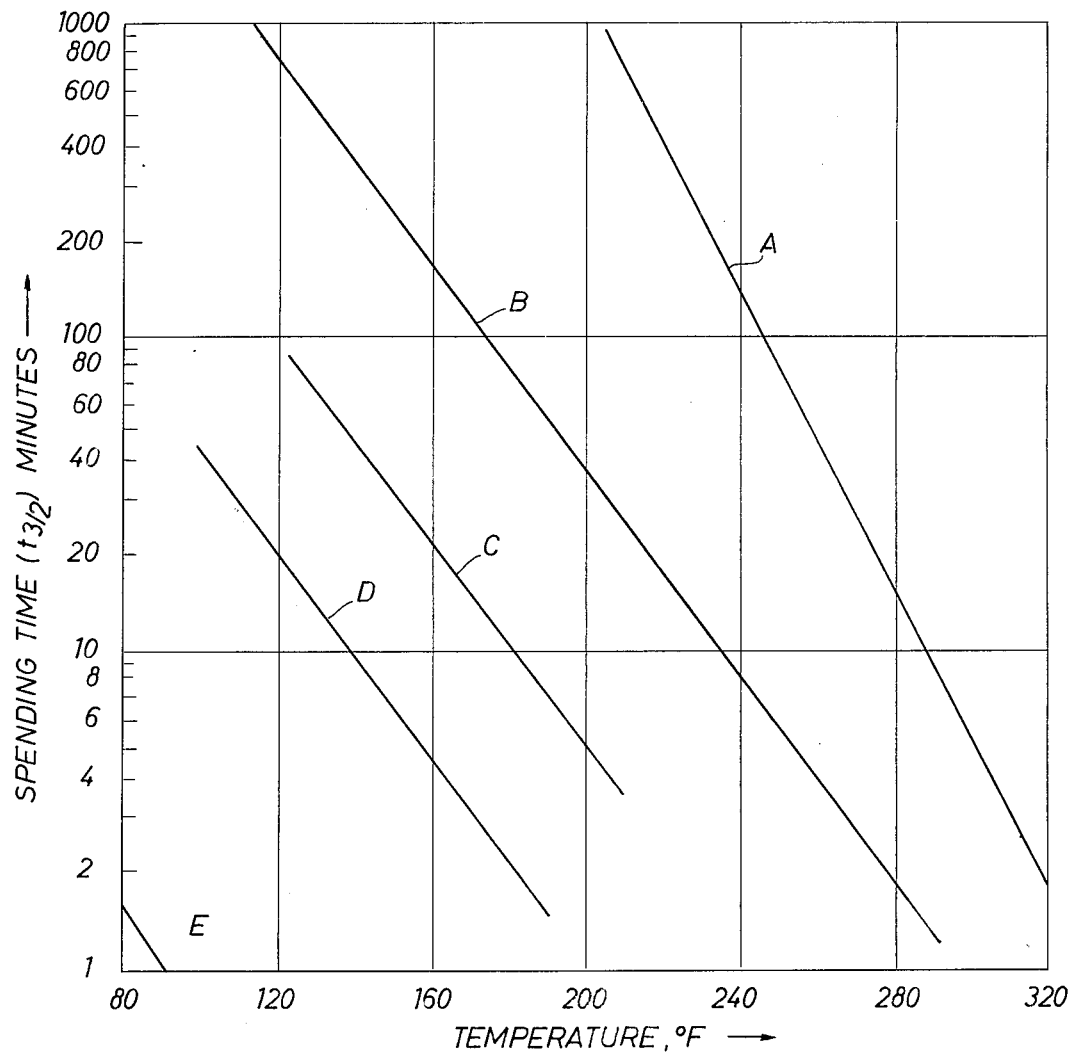
FIG. 4 shows comparative variations with temperature of the spending times of acids formed in aqueous solutions containing esters, buffers and chlorocarboxylic acid salts in contact with acid-reactive materials.

The relative positions of the curves C and D on FIG. 4 show that, in reacting with dolomite materials, buffered solutions of formic or acetic acids and their salts

TABLE III

| Test | Pack Type$^{a)}$ | Methyl Formate Concentration moles/liter | Temp. °F | Flow Rate cc/min | $t_r^{b)}$ | k (X1000) min$^{-1}$ | $t_{\frac{1}{2}}^{c)}$ | pH$^{d)}$ | Equilibrium Effluent Analyses Conc., Moles/liter | | | | |
|---|---|---|---|---|---|---|---|---|---|---|---|---|---|
| | | | | | | | | | Formate | Formic | $f_{ate} + f_{ic}^{e)}$ | Ca$^{++}$ | $f_{ate} + f_{ic}$ |
| 5/10/77 | CaCO$_3$ | 1 | 140 | 1 | 128 | 7.3 | 95 | 4.85 | 0.53 | 0.08 | 0.61 | 0.27 | 2.26 |
| 5/5/77 | CaCO$_3$ | 2 | 140 | 1 | 128 | 4.2 | 164 | 4.65 | 0.71 | 0.13 | 0.84 | 0.32 | 2.63 |
| 5/19/77 | Dolomite | 1 | 160 | 2 | 64 | 12.5 | 56 | 4.15 | 0.43 | 0.12 | 0.55 | 0.25 | 2.20 |
| 2/2/77 | CaCO$_3$ | 2 | 160 | 2 | 64 | 10.4 | 67 | 4.20 | 0.73 | 0.24 | 0.97 | 0.36 | 2.69 |
| 1/28/77 | CaCO$_3$ | 2 | 180 | 2 | 64 | 28.5 | 25 | 3.95 | 1.24 | 0.43 | 1.67 | 0.59 | 2.83 |
| 5/4/77 | CaCO$_3$ | 2 | 180 | 2 | 64 | 22.9 | 30 | 4.4 | 1.28 | 0.26 | 1.54 | 0.68 | 2.26 |
| 5/11/77 | CaCO$_3$ | 1 | 200 | 4 | 32 | 55.9 | 12 | 4.6 | 0.73 | 0.10 | 0.83 | 0.34 | 2.44 |
| 5/13/77 | Dolomite | 1 | 200 | 4 | 32 | 56.1 | 12 | 4.35 | 0.67 | 0.17 | 0.84 | 0.34 | 2.47 |

FIG. 4 illustrates the variations with temperature of spending times (amounting to three half-lives) of various acidizing solutions that dissolve carbonate minerals at much slower rates than those of strong acids. In the tested solutions, the indicated components were dissolved in otherwise substantially electrolyte-free aqueous liquids. And, where a flow through a sandpack or a core is indicated, the flow was conducted in a manner generally comparable to those described in connection with Table I. Curve A relates to a solution of 1.0 mole ammonium chloroacetate flowing through a sandpack containing either (in % by weight) 5% limestone or 5% dolomite. Curve B relates to a solution of 1.0 mole methyl formate flowing through a sandpack containing either 5% limestone or 5% dolomite. Curve C relates to a solution of 1.0 mole acetic acid and 1.0 mole ammonium acetate flowing through a dolomite core. Curve D relates to a solution of 1.0 mole formic acid and 1.0 mole ammonium formate flowing through a dolomite core. Curve E relates to a solution of 1.0 mole acetic acid and 1.0 mole ammonium acetate flowing through a limestone core. All of the data utilized is believed to be comparable, at least with respect to the hydrolysis kinetics and acidizing solution spending-time behavior, so that they are representative of the differences in the reaction rates in contact with the specified acid-reactive materials.

As indicated by the relative positions of curves A and B, where the material to be acidized is mainly a limestone or a dolomite, and it is desirable to employ an acid-spending time in the range of from about 40-400 minutes, an acidizing solution in which all or at least most of the hydrolyzable component is methyl formate, is particularly suited for use in reservoirs having temperatures of from about 140°-200° F., while such a solution in which the hydrolyzable component is a chloroacetate ion is best suited for a temperature of from about 220°-260° F. As indicated in the figure, a solution of either type is capable of providing a spending time of about one hour in either a limestone or dolomite reserare significantly, but not extensively, more rapidly reactive than a solution of methyl formate in contact with either dolomite or limestone materials. However, the relative position of curve E shows that, in contrast to the behavior of the solutions utilized in the present invention, when a buffered solution of acetic acid and ammonium acetate reacts with limestone, rather than dolomite, the limestone reaction is very much faster. The unobvious behavior of the present invention in providing reaction rates that are substantially equal with either dolomite or limestone materials, is particularly advantageous in situations when it is not known which type of carbonate mineral may be present in the earth formation to be treated.

The lower alcohol esters which are useful in the present invention comprise those having a solubility of from about 0.1 to 2 moles per liter in a relatively fresh and soft water. Methyl formate is particularly suitable. Other examples of suitable alcohols include the methyl esters of $C_2$ to $C_4$ fatty acids, the ethyl esters of such $C_1$ to $C_4$ acids, isopropyl formate, and the like esters.

What is claimed is:

1. A process for relatively slowly acidizing a carbonate material in or around a well that communicates with a subterranean earth formation, which process comprises:

compounding an aqueous solution that contains at least one chlorocarboxylic acid salt and is substantially free of acid;

arranging the composition of the solution so that, at the temperature of the subterranean earth formation, the chlorocarboxylic acid salt hydrolyzes at a selected relatively slow rate to yield an acid that is capable of reacting with calcium or magnesium carbonates to form calcium or magnesium salts which are soluble at a concentration equivalent to the concentration of chlorocarboxylic acid salt; and injecting the solution into the subterranean earth formation at a rate such that the carbonate material to be acidized is contacted by the solution before it contains enough acid to dissolve a significant proportion of the carbonate material, so that the rate of the acidization is limited to substantially the rate of the hydrolyzing of the chlorocarboxylic acid salt.

2. The process of claim 1 in which a slug of the chlorocarboxylic acid salt solution is injected into the earth formation and allowed to remain substantially static for a selected time.

3. The process of claim 1 in which the chlorocarboxylic acid salt solution is injected into the earth formation at a pressure sufficient to form or extend a fracture.

4. The process of claim 1 in which the viscosity of the chlorocarboxylic acid salt solution is increased by dissolving a water-thickening material in it.

5. The process of claim 1 in which the chlorocarboxylic acid salt solution contains a salt of an acid of the group consisting of chloroacetic acid, 2-chloropropionic acid, and dichloroacetic acid.

6. The process of claim 1 in which the chlorocarboxylic acid salt solution is a chloroacetic acid salt of a cation of the group ammonium, potassium and sodium.

7. The process of claim 1 in which the concentration of the aqueous solution of chlorocarboxylic acid salt is from about 0.5 to 1.0 moles/liter.

8. The process of claim 1 in which the temperature of the earth formation into which the chlorocarboxylic acid salt is injected is from about 200° to 280° F.

9. The process of claim 1 in which the chlorocarboxylic acid salt solution is mixed with an aqueous solution containing from about 0.1 to 2 moles per liter of dissolved lower alcohol ester.

10. The process of claim 1 in which a slug of the chlorocarboxylic acid salt solution is preceded or followed by a slug of an aqueous solution containing from about 0.1 to 2 moles per liter of dissolved lower alcohol ester.

11. The process of claim 10 in which the chlorocarboxylic acid salt solution contains from about 0.5 to 1.0 mole per liter of ammonium chloroacetate and the ester solution is a solution of methyl formate.

12. The process of claim 11 in which the earth formation may contain both limestone and dolomite materials and the volume of the ester solution equals the pore volume within a cylindrical region having a diameter of from about 6 to 24 inches greater than that of the wellbore and a heighth about equalling that of that portion of the earth formation.

13. The process of claim 12 in which the ester solution precedes the salt solution.

14. The process of claim 1 in which
the acidizing solution is injected into the subterranean earth formation and then backflowed out of that formation and into relatively large volume surface-located fluid-containers; and
the concentration of salt solution and the arrangement of the conduits for backflowing the injected fluid into the surface-located containers are correlated with the reservoir and conduit temperatures to the extent necessary to avoid cooling the backflowing liquid to a temperature-concentration condition conducive to significant precipitation of calcium hydroxycarboxylate salt prior to its reaching the surface-located fluid containers.

* * * * *